United States Patent
Wilson et al.

(10) Patent No.: US 9,102,393 B2
(45) Date of Patent: Aug. 11, 2015

(54) SEAL ASSEMBLY FOR AN AIRCRAFT WING

(71) Applicant: AIRBUS OPERATIONS LIMITED, Bristol (GB)

(72) Inventors: James Wilson, Bristol (GB); Paul Hadley, Bristol (GB); Alan Quayle, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 355 days.

(21) Appl. No.: 13/845,620

(22) Filed: Mar. 18, 2013

(65) Prior Publication Data
US 2013/0320141 A1 Dec. 5, 2013

(30) Foreign Application Priority Data
Mar. 22, 2012 (GB) .................................. 1205079.5

(51) Int. Cl.
*B64C 3/18* (2006.01)
*B64C 3/26* (2006.01)

(52) U.S. Cl.
CPC ................. *B64C 3/185* (2013.01); *B64C 3/187* (2013.01); *B64C 3/26* (2013.01)

(58) Field of Classification Search
USPC ......................... 244/123.1, 131, 132; 403/288
See application file for complete search history.

(56) References Cited

U.S. PATENT DOCUMENTS

| | | | | |
|---|---|---|---|---|
| 1,331,150 A | * | 2/1920 | Hooper | 244/132 |
| 2,140,672 A | * | 12/1938 | Gray et al. | 156/92 |
| 3,499,622 A | * | 3/1970 | Surcin et al. | 244/130 |
| 4,113,910 A | * | 9/1978 | Loyd | 428/162 |
| 4,905,931 A | * | 3/1990 | Covey | 244/1 A |
| 6,173,925 B1 | * | 1/2001 | Mueller et al. | 244/219 |
| 6,719,870 B2 | * | 4/2004 | Ludin et al. | 156/293 |
| 7,198,691 B2 | * | 4/2007 | Ludin et al. | 156/293 |
| 7,909,290 B2 | * | 3/2011 | Cooper | 244/132 |
| 7,997,534 B2 | * | 8/2011 | Eberth | 244/131 |
| 8,070,100 B2 | * | 12/2011 | Douglas | 244/123.1 |
| 8,177,169 B2 | * | 5/2012 | Lobo Barros et al. | 244/131 |
| 8,376,278 B2 | * | 2/2013 | Stewart | 244/123.1 |
| 8,870,118 B2 | * | 10/2014 | Moselage, III | 244/120 |
| 2004/0166333 A1 | * | 8/2004 | Byrd et al. | 428/447 |
| 2008/0210824 A1 | * | 9/2008 | Eberth | 244/131 |
| 2008/0258008 A1 | * | 10/2008 | Cooper | 244/131 |
| 2010/0065687 A1 | * | 3/2010 | Douglas | 244/130 |

(Continued)

FOREIGN PATENT DOCUMENTS

CN 202138536 U 2/2012

OTHER PUBLICATIONS

GB Search Report for Application No. GB 1205079.5, dated Jun. 25, 2012.

*Primary Examiner* — Joseph W Sanderson
(74) *Attorney, Agent, or Firm* — Lowe Hauptman & Ham, LLP

(57) ABSTRACT

A wing assembly for an aircraft is disclosed having a spar, a wing cover, and a rib. The spar has a web portion and a flange portion joined by a radius corner, wherein a gap is formed at an interface between the spar, the wing cover and the rib. The assembly further includes a seal member which substantially covers the gap, and sealant provided between the seal member and the rib and/or the wing cover and/or the spar so as to seal the gap.

18 Claims, 4 Drawing Sheets

(56) References Cited

U.S. PATENT DOCUMENTS

| | | | |
|---|---|---|---|
| 2010/0107513 A1* | 5/2010 | Buchanan et al. ................. 52/84 |
| 2010/0193636 A1* | 8/2010 | De Vita et al. ............. 244/123.1 |
| 2010/0243810 A1* | 9/2010 | Lobo Barros et al. ........ 244/131 |
| 2010/0308170 A1* | 12/2010 | Hadley et al. ................. 244/131 |
| 2011/0095133 A1* | 4/2011 | Stewart ...................... 244/123.1 |
| 2011/0226896 A1* | 9/2011 | Bessho et al. ................. 244/1 A |
| 2012/0132753 A1* | 5/2012 | Caballero et al. ............. 244/131 |
| 2013/0292514 A1* | 11/2013 | Moselage, III ............... 244/120 |

* cited by examiner

SEAL ASSEMBLY FOR AN AIRCRAFT WING

RELATED APPLICATIONS

The present application is based on, and claims priority from, Great Britain Application Number 1205079.5, filed Mar. 22, 2012, the disclosure of which is hereby incorporated by reference herein in its entirety.

FIELD OF THE INVENTION

The invention relates to a wing assembly, an aircraft having the wing assembly and a method for sealing a gap in an aircraft wing assembly.

BACKGROUND OF THE INVENTION

When an aircraft is in flight, air may enter the wing at the leading edge and move along the leading edge cavity (between the front spar and the "D nose" leading edge panel) before exiting the wing at a different location. The movement of air into and out of the wing results in "leakage drag" due to the disruption of airflow over the aerodynamic surfaces of the wing, increasing the overall drag of the aircraft. At high speeds, leakage drag may contribute significantly to the overall drag of the aircraft, reducing performance and increasing fuel consumption.

In order to minimise the leakage drag experienced by an aircraft, it is desirable to reduce or prevent the bulk movement of air along the leading edge cavity. A plurality of transverse ribs present in a conventional aircraft wing structure act to divide the leading edge cavity into a series of compartments, and at least some of these compartments are sealed by the ribs to substantially prevent the movement of air from one compartment to another along the leading edge.

Conventional wing spars typically have a web portion and upper and lower flange portions for attaching to the upper and lower wing covers respectively joined to the web portion. The web portion may be sealed against the ribs and the flange portions may be sealed against the upper and lower wing covers. Gaps may be formed at interfaces between a spar, a rib and a wing cover adjacent a corner between the web portion and one of the flange portions, and these gaps may be sealed using an aerospace grade sealant. A metallic spar may have a relatively sharp corner with a small radius so that the gap is relatively small and easily filled using conventional aerospace sealant.

Modern wing structures may include fibre-reinforced composite spars. Due to the difficulty of forming composite components having an abrupt corner, a composite spar may have a radius corner formed at a junction between a web portion and a flange portion. The radius corner may result in larger gaps being formed adjacent the outside of the radius corner where the spar meets a wing panel and a rib than would be experienced with a conventional metallic spar having a corner with a smaller radius. These gaps may be difficult to satisfactorily seal using conventional aerospace sealant due to the dimensions of the gaps.

SUMMARY OF THE INVENTION

A first aspect of the invention provides a wing assembly for an aircraft comprising a wing spar, a wing cover and a structural component attached to the wing spar; wherein the wing spar has a web and a flange connected by a radius corner, and the spar flange is attached to the wing cover such that a gap is formed at an interface between the spar, the wing cover and the structural component; the assembly further comprising a seal member which substantially covers the gap, and sealant provided between the seal member and at least one of the structural component, the wing cover and the wing spar so as to seal the gap.

A second aspect of the invention provides an aircraft comprising a wing assembly according to the first aspect.

A third aspect of the invention provides a method for sealing a gap in an aircraft wing assembly having a wing spar, a wing cover and a structural component attached to the wing spar, wherein the wing spar has a web and a flange connected by a radius corner, and the spar flange is attached to the wing cover such that a gap is formed at an interface between the spar, the wing cover and the structural component, the method comprising: attaching a seal member to the structural component and/or the wing cover and/or the wing spar so as to substantially cover the gap; and providing sealant between the seal member and at least one of the structural member, the wing cover and the wing spar so as to seal the gap.

The gap may be of a size and/or shape which is difficult to fill using conventional sealant or filler materials, for example due to a comparatively large radius of the radius corner.

The corner may have a radius of at least 20 mm, preferably at least 40 mm, and most preferably approximately 40 mm to approximately 60 mm.

By substantially covering the gap, the seal member significantly reduces the area and the width of the gap to be sealed using a sealant or filler material, so that the gap may be more easily sealed using a conventional sealant or filler material.

The seal member may also increase the structural integrity of the seal compared to a seal formed using sealant alone. In particular, because the sealant material may become damaged or degraded over time, reducing the quantity of sealant material used and the area covered by the sealant material may reduce the likelihood of a reduction in sealing performance over time due to degradation of the sealant material. The invention may, therefore, prolong the life of the seal.

The seal member and the sealant may substantially prevent the flow of air through the gap.

The seal member may comprise a projecting portion which extends over the gap.

The projecting portion may be shaped to compliment a profile of the gap.

The seal member may comprise a body portion and a projecting portion which tapers away from the body portion. The seal member may be, for example, substantially plectrum shaped.

The seal member may be substantially planar. The seal member may, for example, be a planar component which is attached to one side of the structural component and which substantially covers the gap without extending significantly into the gap in a direction perpendicular to the plane of the seal member. Alternatively, the seal member may have significantly 3-dimensional shape and may have a portion of significant depth extending into the gap.

The seal member may comprise an attachment portion which is attached to at least one of the structural component, the wing cover and the wing spar. Preferably the attachment portion is attached to a side or face of the structural component with which it overlaps.

The seal member may be attached to at least one of the structural component, the wing cover and the wing spar by an adhesive. Alternatively, the seal member may be attached to the structural component and/or the wing cover and/or the wing spar using mechanical fasteners.

The seal member may include any material suitable for sealing a gap in an aerospace application, including plastics, metals, glasses and composite materials.

The sealant may be an aerospace grade sealant.

The wing spar may comprise a fibre reinforced composite material, preferably a carbon fibre reinforced polymer.

The wing spar may be a front spar for an aircraft wing.

The wing cover may be an upper wing cover or a lower wing cover. The gap may, therefore, be a gap formed at an upper or lower edge of a wing spar.

The structural component may be a wing rib. Alternatively the structural component may be any other component attached to a wing spar, for example a pylon attachment bracket for supporting an engine or an attachment bracket for a landing gear component.

The wing rib may be a sealed forward rib disposed at a leading edge of the wing assembly so as to define a boundary between two compartments within the leading edge, and the rib and the sealed seal member may be operable to substantially prevent a flow of air between the two compartments.

The assembly may further comprise a plurality of the sealed forward ribs spaced along the wing spar The seal member and sealant may be fitted to seal a gap between any spar, wing cover and rib in any aircraft wing, including wings which are already in service. The invention may, therefore, be applied to a new wing being built or alternatively may be cost effectively retro-fitted to an in-service aircraft without requiring significant maintenance activities or modification of the spar, wing cover and rib components.

BRIEF DESCRIPTION OF THE DRAWINGS

Embodiments of the invention will now be described with reference to the accompanying drawings, in which.

DETAILED DESCRIPTION OF EMBODIMENTS

Figure 1:
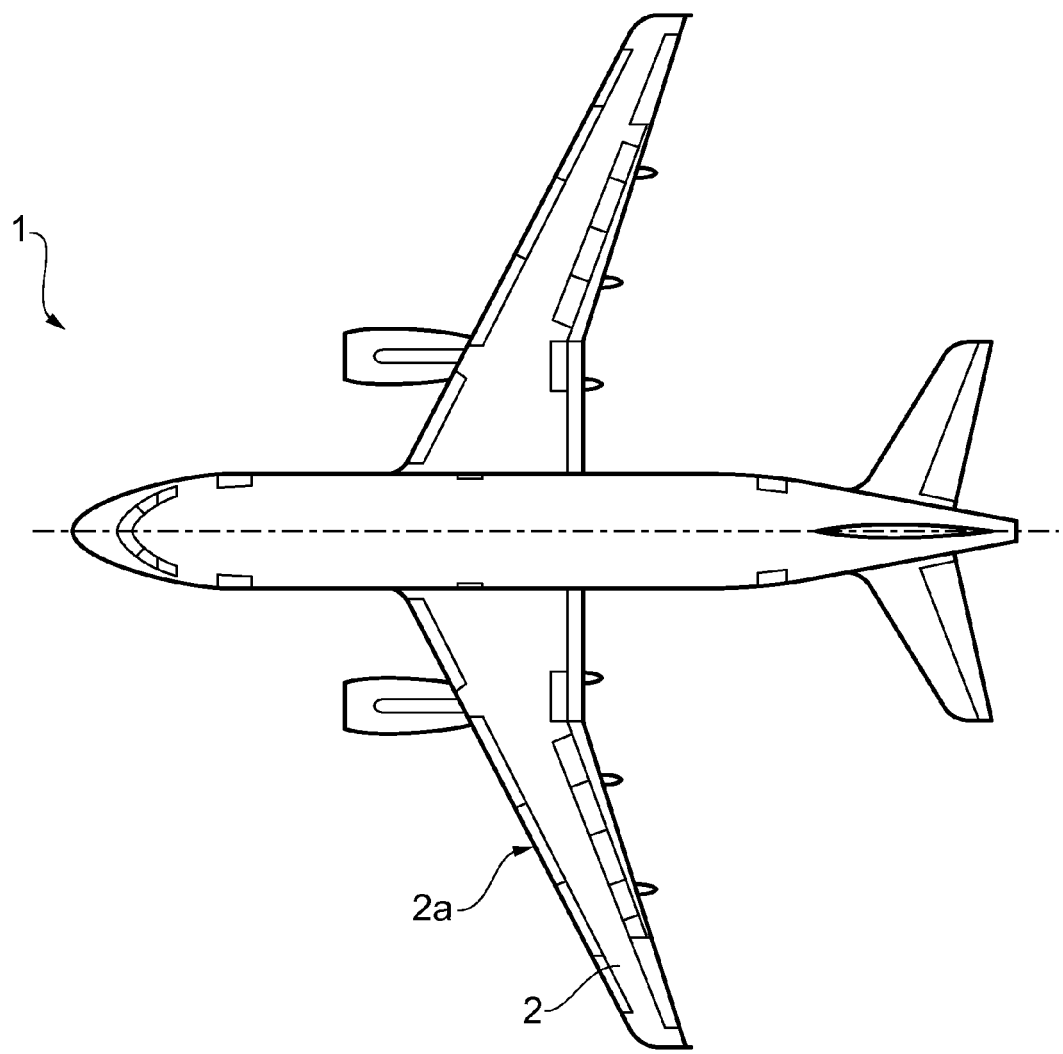
FIG. 1 illustrates an aircraft.

FIG. 1 illustrates an aircraft 1 having a wing 2 with a leading edge 2a. The wing 2 comprises a wing box formed by front and rear longitudinal spars and upper and lower wing covers. The wing 2 also comprises leading and trailing edge panels and a plurality of transverse ribs spaced along the length of the wing. A leading edge cavity extending spanwise along the wing 2 is formed between the leading edge panel and the front spar, and is divided into a plurality of compartments by the ribs. Other wing components have been omitted from the description for increased clarity.

Figure 2:
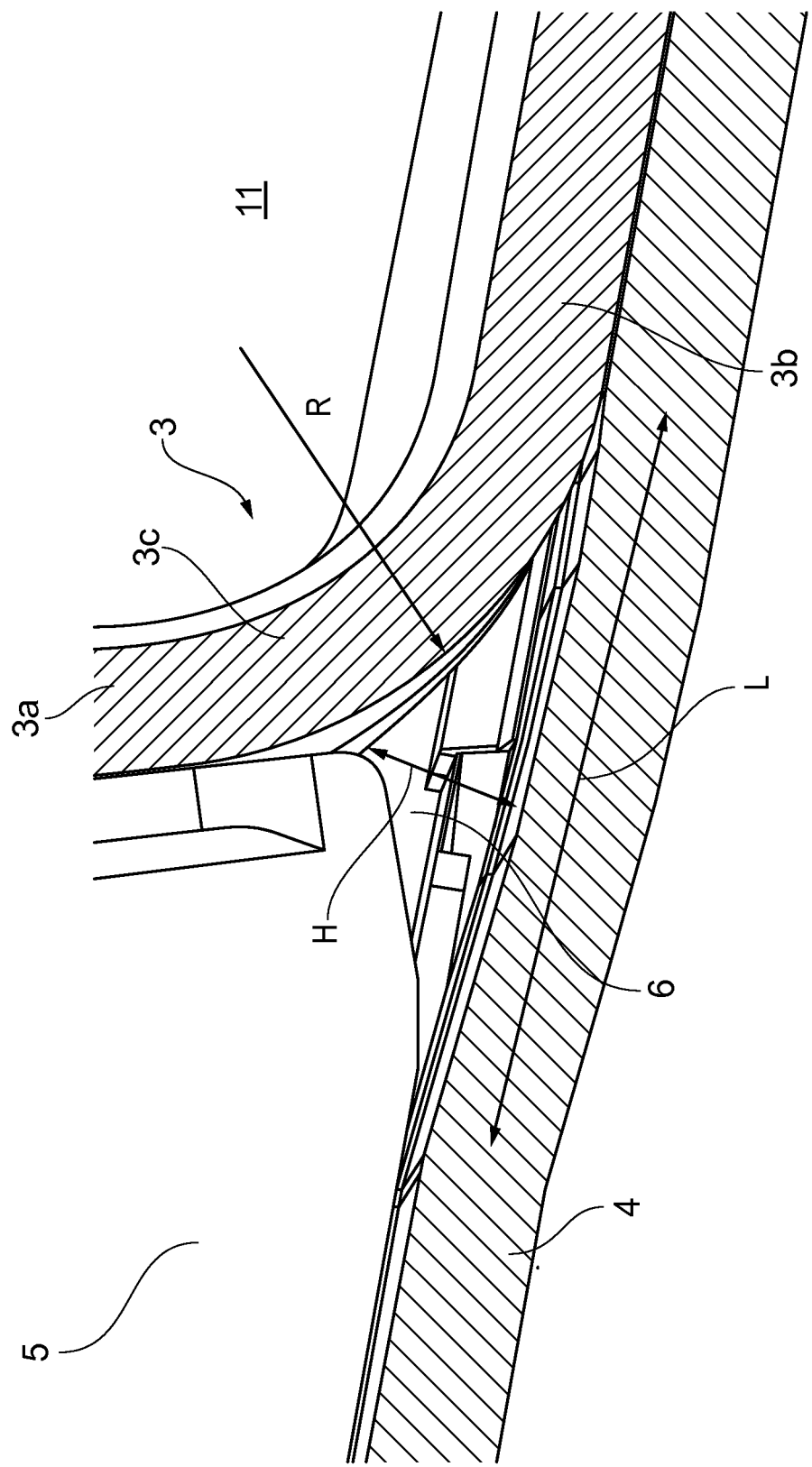
FIG. 2 illustrates a cross-section through an aircraft wing.

The front spar 3 comprises a web portion 3a and a lower flange portion 3b, as shown in FIG. 2. The lower flange portion 3b is joined to the web portion 3a by a curved corner or radius corner (ie a corner having a radius) 3c, and is attached to the lower wing cover 4. The spar 3 also comprises an upper flange portion (not shown) which is joined to the web portion 3a by a similar curved corner or radius corner, and which is attached to the upper wing cover.

The front spar 3 is formed of a carbon fibre reinforced polymer material comprising a plurality of carbon fibre plies in a matrix material, and is formed by arranging a plurality of pre-preg carbon fibre plies on a male mould tool before curing the plies to produce a consolidated component. If a stack of carbon fibre plies is laid over a sharp corner of a tool, the sudden change of direction of the ply stack can result in discontinuities and stress concentrations within the component. The corner 3c is, therefore, formed with a radius to minimise problems associated with manufacturing composite components with abrupt changes of direction. The radius corner 3c has an outside radius R of approximately 50 mm.

One of the ribs 5 is sealed against the web portion 3a and a cavity or gap 6 is formed adjacent the outside of the radius corner 3c at an interface between the front spar 3, the lower wing cover 4 and the rib. (Similar gaps are formed at a plurality of rib locations along the length of the spar.) The comparatively large outside radius R of the radius corner 3c compared to, for example, a sharp corner or a curved corner with a smaller radius of a machined metallic spar contributes significantly to the size of the gap 6. The gap 6 has a maximum height "H" of approximately 15 mm and a maximum length "L" of approximately 45 mm. The large radius R results in a gap 6 which is both wider at its widest point and longer than a gap which would be formed at the same location if the web portion 3a and the flange portion 3b were connected by a sharp corner or a curved corner having a significantly smaller radius.

Figure 3:
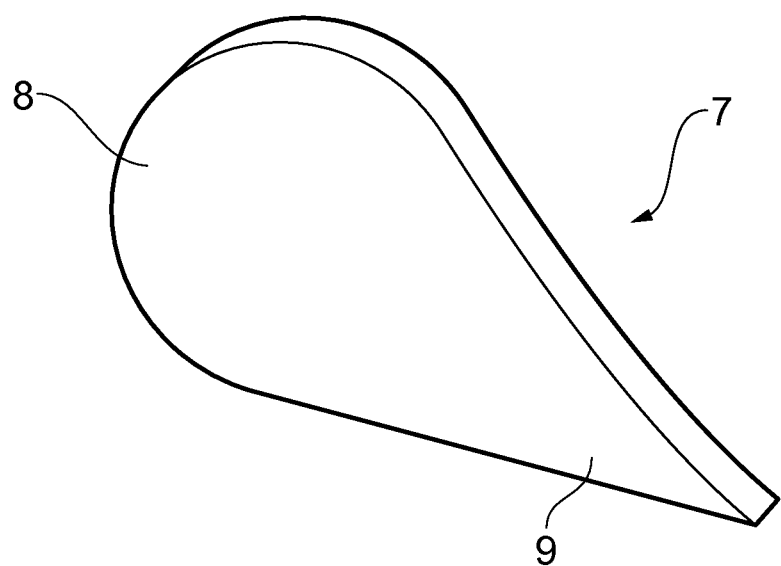
FIG. 3 illustrates a seal member.
Figure 4:
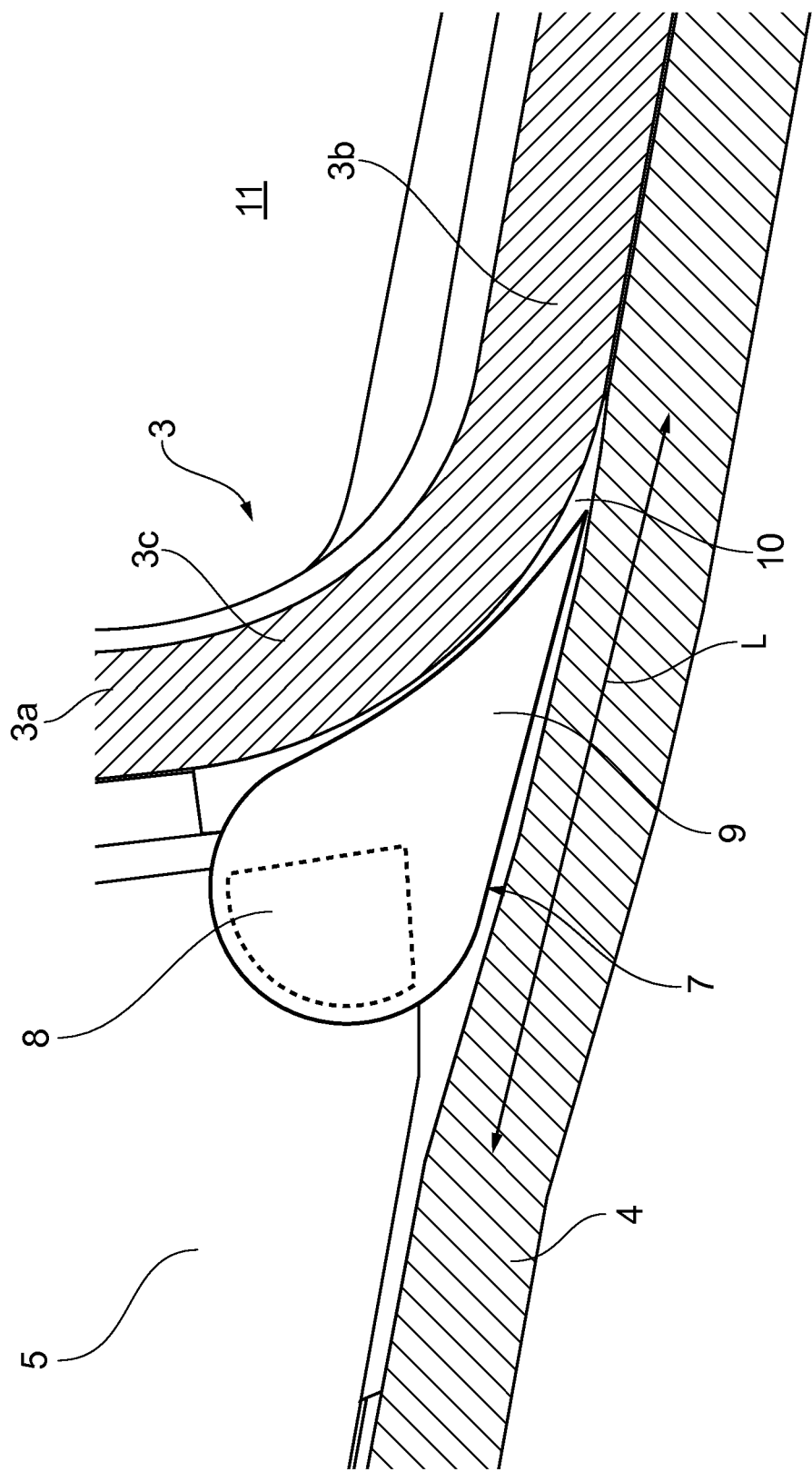
FIG. 4 illustrates a seal member sealing a gap in a wing in accordance with an embodiment of the invention.

A plastics seal member 7, as shown in FIG. 3, is fitted to a side of the rib 5, as shown in FIG. 4. The seal member comprises an attachment portion 8 and a projecting portion 9 and is substantially plectrum shaped (ie it has a body portion and a projecting portion which tapers away from the body portion). The attachment portion 8 overlaps with the rib 5 and is bonded to the side of the rib with a layer of adhesive (not shown). The location of the adhesive used to bond the seal member 7 to the rib 5 is indicated by the dashed line in FIG. 4. The projecting portion 9 extends substantially over and across the gap 6 and has a shape which compliments the shape of the gap and substantially covers the area of the gap. The outside edge of the projecting portion 9 approximately follows the shape of the outside of the radius corner 3c and the upper surface of the lower cover 4 so that the maximum distance between the outside edge of the projecting portion and the spar 3 or the lower cover is approximately 3 mm and the distance is less than 2 mm around the majority of the outside edge of the projection portion.

An aerospace grade sealant 10, for example ALPS 06-02-002 (PR-2001-B-2), is applied around the projecting portion 9 so as to seal the space between the outside edge of the seal member 7 and the outside of the radius corner 3c and the upper surface of the lower cover 4. The seal member 7 and the sealant 10 combine to form a seal which seals the gap 6 so that substantially no air can pass through the gap. The seal member 7 and the sealant 10 arrangement therefore substantially prevents the flow of air from a compartment of the leading edge cavity on one side of the gap 6 through the gap to another compartment on the other side of the gap.

A similar seal member and sealant arrangement is employed to seal a similar gap formed at in interface between the spar, the rib and the upper wing cover at the top of the leading edge. The rib 5 itself is a sealed rib which air cannot pass through. By sealing both the upper and lower gaps, the free movement of air from a compartment on one side of the rib 5 to a compartment on the other side of the rib is substantially prevented, so that the bulk movement of high speed air along the leading edge cavity is minimised, thereby reducing leakage drag and overall fuel consumption of the aircraft 1 during flight.

A plurality of similar arrangements are employed to seal a plurality of similar gaps formed adjacent the upper and lower wing covers at a plurality of rib locations along the length of the front spar 3, particularly at rib locations adjacent a major opening in the leading edge 2a through which air may enter the leading edge cavity.

The spar forms a wall of a fuel tank 11 which is housed within the wing box. Because the leading edge cavity is adjacent a fuel tank it is desirable for the leading edge cavity to be vented. The ribs 5 therefore have vents (not shown) which allow the controlled movement of air between the compartments of the leading edge cavity, while the sealed ribs prevent the uncontrolled flow of air along the leading edge cavity.

By providing a seal member which reduces the dimensions of the area to be covered by the sealant 10, the gap 6 is rendered significantly easier to seal by the application of sealant. In addition, since the area of the gap which is covered by sealant 10 is reduced, the seal is less likely to experience loss of sealing performance over time if the sealant material becomes damaged or degraded over time, for example due to age hardening, wear or exposure to chemicals or severe changes in temperature.

Using the seal member 7 to substantially cover the gap 6 is a preferable solution to providing a foot-like type extension extending from the rib 5 because the seal member provides a cost effective and lighter solution to the problem of covering the gap. In particular, if the rib 5 is a metallic component which is machined form a billet, providing a foot portion which extends into the gap 6 to reduce the gap dimensions would significantly increase the size of the billet from which the rib would need to me machined and the amount of material to be removed, and therefore the cost of manufacturing the rib and the amount of material which is wasted.

The invention has been described in relation to one wing of an aircraft. The same seal member and sealant arrangement may however be used to block gaps formed adjacent a spar in both wings of an aircraft to reduce or prevent the bulk movement of air along the leading edge compartment of each wing.

The seal member 7 and sealant 10 may be applied to seal the gap 6 during construction of a new wing. Alternatively, the seal member 7 and sealant 10 may be retrofitted to cover a gap 6 in an existing wing, for example a wing of an in service aircraft. The invention therefore provides an easy and cost effective method for sealing gaps formed in wing structures on both new aircraft and existing aircraft in a fleet.

In the embodiment described above, the spar 3 has a C-section with integrated upper and lower flange portions. However, in an alternative embodiment, the spar may have a different design. For example, the spar may have a C-section formed by attaching two discrete upper and lower L-section flange portions to a spar web, or by attaching two upper and lower L-section spar members, each having a flange portion and a web portion which overlaps with and is attached to the web portion of the other spar member. Alternatively, the spar may have an S-section formed with integrated upper and lower flange portions. Alternatively, the spar may have an S-section formed by attaching two discrete upper and lower L-section flange portions to a spar web, or by attaching two upper and lower L-section spar members, each having a flange portion and a web portion which overlaps with and is attached to the web portion of the other spar member. The spar may be part of a U-box or an N-box comprising a front spar and a rear spar. The spar may generally be of any known type having a radius corner connecting a web and a flange.

In an alternative embodiment, a seal member and sealant arrangement may be used to seal a gap formed adjacent the upper wing cover at a particular rib location but not a gap formed adjacent the lower wing cover at that rib location or vice-versa.

In an alternative embodiment, the seal member may not be a plastics component but may comprise any material suitable for use in an aircraft structure, preferably a material which is substantially non-porous so air cannot pass freely through it. The seal member may, for example, be a metallic component or a composite component.

In an alternative embodiment, the seal member may not be bonded to the rib using a layer of adhesive but may instead be attached to the rib using mechanical fasteners.

In an alternative embodiment, the seal member may not be attached to the rib via an overlapping attachment portion but may instead be attached to any one or more of the rib and/or spar and/or wing cover via one or more overlapping and/or abutting attachment portions.

In an alternative embodiment the seal member may be surrounded by an adhesive or a filler material which is not an aerospace sealant, and the adhesive or filler may act as a sealant to seal a region of the gap between the outside edge of the seal member and the rib and/or spar and/or wing cover.

In an alternative embodiment, the seal member may not be a substantially planar, plectrum shaped component attached to one side of a rib. The seal member may, for example, comprise two plectrum shaped end portions attached to each side of a rib and a central portion extending through the gap and connecting the end portions.

In an alternative embodiment, the seal member may be used to seal a gap formed at an interface between a wing rib, a wing cover and a bracket or pylon which is attached to the wing rib. The bracket or pylon may be, for example a bracket or pylon for mounting an engine. The wing cover may be attached to a flange of the rib and the bracket may be attached to a web of the rib.

Any feature or combination of features of any embodiment described above may be combined with any feature or combination of features from any other embodiment.

Although the invention has been described above with reference to one or more preferred embodiments, it will be appreciated that various changes or modifications may be made without departing from the scope of the invention as defined in the appended claims.

The invention claimed is:

1. A wing assembly for an aircraft comprising:
a wing spar,
a wing cover and
a structural component attached to the wing spar;
wherein the wing spar has a web and a flange connected by a radius corner, and the flange is attached to the wing cover such that a gap is formed at an interface between the spar, the wing cover and the structural component;
the assembly further comprising a seal member which substantially covers the gap, and sealant provided between the seal member and at least one of the structural component, the wing cover and the wing spar; the wing spar, the wing cover, and the structural component each being in contact with at least one of the seal member and sealant so as to seal the gap.

2. An assembly according to claim 1, wherein the seal member and the sealant substantially prevent a flow of air through the gap.

3. An assembly according to claim 1, wherein the seal member comprises a projecting portion which extends over the gap.

4. An assembly according to claim 3, wherein the projecting portion is shaped to compliment a profile of the gap.

5. An assembly according to claim 1, wherein the seal member comprises a body portion and a projecting portion which tapers away from the body portion.

6. An assembly according to claim 1, wherein the seal member is substantially planar.

7. An assembly according to claim 1, wherein the seal member comprises an attachment portion which is attached to at least one of the structural component, the wing cover and the wing spar.

8. An assembly according to claim 1, wherein the seal member is attached to at least one of the structural component, the wing cover and the wing spar by an adhesive.

9. An assembly according to claim 1, wherein the sealant is an aerospace grade sealant.

10. An assembly according to claim 1, wherein the spar comprises a fibre reinforced composite material.

11. An assembly according to claim 1, wherein the wing spar is a front spar.

12. An assembly according to claim 1, wherein the wing cover is an upper wing cover or a lower wing cover.

13. An assembly according to claim 1, wherein the structural component is a wing rib.

14. An assembly according to claim 13, wherein the wing rib is at least a sealed forward rib disposed at a leading edge of the wing assembly so as to define a boundary between two compartments within the leading edge, wherein the rib and the sealed seal member are operable to substantially prevent a flow of air between the two compartments.

15. An assembly according to claim 14, wherein the at least a sealed forward rib is a plurality of sealed forward ribs spaced along the wing spar.

16. An aircraft comprising a wing assembly according to claim 1.

17. A method for sealing a gap in an aircraft wing assembly having a wing spar, a wing cover and a structural component attached to the wing spar, wherein the wing spar has a web and a flange connected by a radius corner, and the flange is attached to the wing cover such that a gap is formed at an interface between the spar, the wing cover and the structural component, the method comprising:
attaching a seal member to at least one of the structural component, the wing cover, and the wing spar so as to substantially cover the gap; and
providing sealant between the seal member and the at least one of the structural member, the wing cover and the wing spar, and wherein the spar, the wing cover and the structural component each being in contact with at least one of the seal member and sealant so as to seal the gap.

18. A wing assembly for an aircraft comprising
a wing spar, a wing cover and a structural component attached to the wing spar;
wherein the wing spar has a web and a flange connected by a radius corner, and the spar flange is attached to the wing cover such that a gap is formed at an interface between the spar, the wing cover and the structural component;
the assembly further comprising a seal member which substantially covers the gap and a portion of the seal member overlaps with the structural component, and sealant provided between the seal member and at least one of the structural component, the wing cover and the wing spar so as to seal the gap.

* * * * *